US011283732B2

(12) United States Patent
Gopinath et al.

(10) Patent No.: US 11,283,732 B2
(45) Date of Patent: Mar. 22, 2022

(54) NETWORK FUNCTIONS VIRTUALIZATION (NFV) BACKPLANE ON FORWARDING MICROCHIP

(71) Applicant: Juniper Networks, Inc., Sunnyvale, CA (US)

(72) Inventors: Sudheendra Gopinath, Bangalore (IN); Mallikarjun Tallapragada, Bangalore (IN); Arun Patial, Banglaore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/370,331

(22) Filed: Mar. 29, 2019

(65) Prior Publication Data
US 2020/0314029 A1    Oct. 1, 2020

(51) Int. Cl.
*H04L 12/937* (2013.01)
*H04L 49/253* (2022.01)
(Continued)

(52) U.S. Cl.
CPC ........ *H04L 49/254* (2013.01); *H04L 12/4679* (2013.01); *H04L 49/354* (2013.01); *H04L 49/9063* (2013.01)

(58) Field of Classification Search
CPC . H04L 49/254; H04L 12/4679; H04L 49/354; H04L 49/9063
See application file for complete search history.

(56) References Cited

U.S. PATENT DOCUMENTS 9,331,940 B2    5/2016  Florin et al.
9,847,915 B2   12/2017  Peter et al.
(Continued)

FOREIGN PATENT DOCUMENTS

CN    104584491 A    4/2015
CN    105247826 A    1/2016
(Continued)

OTHER PUBLICATIONS

Extended Search Report from counterpart European Application No. 19182053.9, dated Dec. 11, 2019, 10 pp.
(Continued)

*Primary Examiner* — Kevin M Cunningham
(74) *Attorney, Agent, or Firm* — Shumaker & Sieffert, P.A.

(57) ABSTRACT

Techniques are disclosed for using a forwarding microchip to implement a network functions virtualization (NFV) backplane within a network device. In one example, processing circuitry of a forwarding microchip establishes a respective logical connection between each of a plurality of virtual ports of the forwarding microchip and each of a plurality of virtual ports configured for respective software-implemented virtual network functions (VNFs) executing on the network device. The processing circuitry receives packets via one or more physical ports of the forwarding microchip and forwards, using the logical connections between each of the plurality of virtual ports of the forwarding microchip and each of the plurality of virtual ports configured for the respective software-implemented VNFs, the packets to a Network Interface Controller (NIC) for forwarding to the plurality of virtual ports configured for the respective software-implemented VNFs.

15 Claims, 9 Drawing Sheets

(51) Int. Cl.
*H04L 12/46* (2006.01)
*H04L 49/354* (2022.01)
*H04L 49/90* (2022.01)

(56) References Cited

U.S. PATENT DOCUMENTS

| | | | |
|---|---|---|---|
| 9,979,639 B2 | 5/2018 | P et al. | |
| 10,237,176 B2 | 3/2019 | K et al. | |
| 10,261,814 B2 | 4/2019 | Trevor et al. | |
| 10,491,517 B2 | 11/2019 | Zhou et al. | |
| 2003/0208645 A1* | 11/2003 | Matters | H04L 12/2854 710/36 |
| 2010/0054260 A1 | 3/2010 | Pandey et al. | |
| 2012/0209940 A1* | 8/2012 | Kidambi | H04L 45/586 709/212 |
| 2012/0291026 A1* | 11/2012 | Biswas | H04L 43/026 718/1 |
| 2014/0003442 A1* | 1/2014 | Hernandez | H04L 12/4645 370/401 |
| 2015/0319009 A1* | 11/2015 | Zhao | H04L 12/4675 370/392 |
| 2016/0212215 A1* | 7/2016 | Anumalasetty | H04L 67/1008 |
| 2018/0191607 A1 | 7/2018 | C et al. | |
| 2019/0042298 A1* | 2/2019 | Sunku | H04L 49/70 |

FOREIGN PATENT DOCUMENTS

| | | |
|---|---|---|
| CN | 105282135 A | 1/2016 |
| CN | 107278362 A | 10/2017 |
| CN | 107566440 A | 1/2018 |
| CN | 107924226 A | 4/2018 |
| CN | 108259216 A | 7/2018 |
| EP | 3343881 A1 | 7/2018 |
| WO | 2013184846 A1 | 12/2013 |

OTHER PUBLICATIONS

Response to Extended Search Report dated Dec. 11, 2019 from counterpart European Application No. 19182053.9, filed Mar. 29, 2021, 23 pp.
First Office Action and Search Report, and translation thereof, from counterpart Chinese Application No. 201910936065.X dated Oct. 22, 2021, 17 pp.

* cited by examiner

NETWORK FUNCTIONS VIRTUALIZATION (NFV) BACKPLANE ON FORWARDING MICROCHIP

TECHNICAL FIELD

This disclosure generally relates to computer networks, and more specifically, to distributed applications.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data centers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

Network architectures have been developed based on integrating software defined network (SDN) and network functions virtualization (NFV) concepts. SDN includes separation of the control plane and the data plane in network nodes similar to network devices, such as routers and switches, and the abstraction of the control plane into a more modular and layered architecture. NFV uses virtualization to remove dependency on specialized hardware and to consolidate many different network equipment types onto industry standard high volume servers, switches and storage, which may be located in data centers, network nodes and in the end user premises. In particular, NFV is a networking technique for decoupling software network functions from physical hardware or silicon. The use of an NFV platform allows for the use of virtual network functions (VNFs) such that the network functions of the NFV platform are hardware-independent. Recently, NFV is revolutionizing the networking industry by allowing the execution of network functions like switching, routing, load-balancing, etc., as Virtual Machines (VMs) on commodity hardware.

SUMMARY

In general, the disclosure describes techniques for using a forwarding microchip to implement a network functions virtualization (NFV) backplane for controlling the communication of packet flows through service chains of virtual network functions (VNFs) executing within a network device. An NFV platform may include an NFV backplane that supports the VNFs by performing routing and switching of packets amongst the VNFs as well as between the VNFs and one or more devices external to the NFV platform.

In accordance with the techniques of the disclosure, the functionality of a forwarding microchip of an NFV platform is configured and extended to serve as an NFV backplane for service chaining VNFs executing on the network device, thereby reducing or eliminating the need for an additional virtualization component to implement the NFV backplane, such as a virtual switch or virtualized I/O interface operable between the forwarding chip and the NFV backplane to facilitate packet flows through the service chains.

As described herein, a forwarding microchip is configured to utilize a plurality of "virtual ports," which may take the form of configurable "loop-back" ports. The virtual ports are internal, logical ports that may be associated with physical ports of the chip, and that can be programmatically used to implement tunnels like GRE, VxLAN, etc. As described herein, a respective virtual port on the forwarding microchip is allocated for and paired with each of a plurality of virtual ports presented by respective software-implemented VNFs. The forwarding microchip can use Layer-2 switching, Layer-3 routing, policies, or Access Control Lists (ACLs) to transfer packets between the virtual ports and the corresponding virtual ports for the VNFs. Further, for a pair of ports comprising a virtual port of the forwarding microchip and a virtual port of a VNF, the pair may be allocated a unique VLAN-ID. As such, connectivity may be established between the forwarding chip and the VMs and in a manner that facilitates forwarding of packet flows through sequences of the virtual ports of the forwarding chip, thereby directing the packets through the VMs according to a defined service chain. In this fashion, an NFV backplane may be implemented directly on the forwarding microchip without requiring a virtualized switch or virtualized I/O interface, thereby simplifying the implementation, configuration, and operation of the NFV backplane.

The techniques of the disclosure provide specific technical advantages to the field of computer networking and network traffic routing. For example, the NFV backplane described herein is feature-rich, in that the NFV backplane inherits all of the features of the forwarding microchip, and such features may be configured in a homogenous manner. Further, the NFV backplane described herein is transparent to the user and administrator, simplifying maintenance by the user. Additionally, because the NFV backplane is automatically configured at initialization, the techniques of the disclosure substantially reduce the likelihood and frequency of misconfiguration. Furthermore, the techniques of the disclosure eliminate the occurrence of packet loops because there is only a single Layer-2 forwarding switch. The techniques of the disclosure further allow for using the Virtual Router Forwarding (VRF) and Virtual Switch capabilities of the forwarding microchip to implement multi-tenant service chains, as well as simplifying the implementation of QoS. The techniques of the disclosure also permit the use of flexible service chains by allowing any service to occur at any point in the service chain, any number of times.

In one example, this disclosure describes a method for processing packets using a network functions virtualization (NFV) backplane within a network device, the method comprising: configuring the NFV backplane within the network device by establishing, by processing circuitry of a forwarding microchip of the network device, a respective logical connection between each of a plurality of virtual ports of the forwarding microchip and each of a plurality of virtual ports configured for respective software-implemented virtual network functions (VNFs) executing on the network device, receiving, by the processing circuitry, the packets via one or more physical ports of the forwarding microchip; and forwarding, by the processing circuitry and using the logical connections between each of the plurality of virtual ports of the forwarding microchip and each of the plurality of virtual ports configured for the respective software-implemented VNFs, the packets to a Network Interface Controller (NIC) for forwarding to the plurality of virtual ports configured for the respective software-implemented VNFs.

In another example, this disclosure describes a forwarding microchip comprising: processing circuitry; one or more physical ports; and a plurality of virtual ports, wherein the processing circuitry is configured to: configure a network functions virtualization (NFV) backplane within a network device by establishing, by the processing circuitry, a respective logical connection between each of a plurality of virtual ports of the forwarding microchip and each of a plurality of virtual ports configured for respective software-implemented virtual network functions (VNFs) executing on the network device; receive packets via one or more physical ports of the forwarding microchip; and forward, using the logical connections between each of the plurality of virtual ports of the forwarding microchip and each of the plurality of virtual ports configured for the respective software-implemented VNFs, the packets to a Network Interface Controller (NIC) for forwarding to the plurality of virtual ports configured for the respective software-implemented VNFs.

In another example, this disclosure describes a network device configured to process packets using a network functions virtualization (NFV) backplane within the network device, the network device comprising: a Network Interface Controller (NIC); and a forwarding microchip comprising: processing circuitry; one or more physical ports; and a plurality of virtual ports, wherein the processing circuitry is configured to: configure the NFV backplane within the network device by establishing, by the processing circuitry, a respective logical connection between each of the plurality of virtual ports of the forwarding microchip and each of a plurality of virtual ports configured for respective software-implemented virtual network functions (VNFs) executing on the network device; receive packets via one or more physical ports of the forwarding microchip; and forward, using the logical connections between each of the plurality of virtual ports of the forwarding microchip and each of the plurality of virtual ports configured for the respective software-implemented VNFs, the packets to the NIC for forwarding to the plurality of virtual ports configured for the respective software-implemented VNFs.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
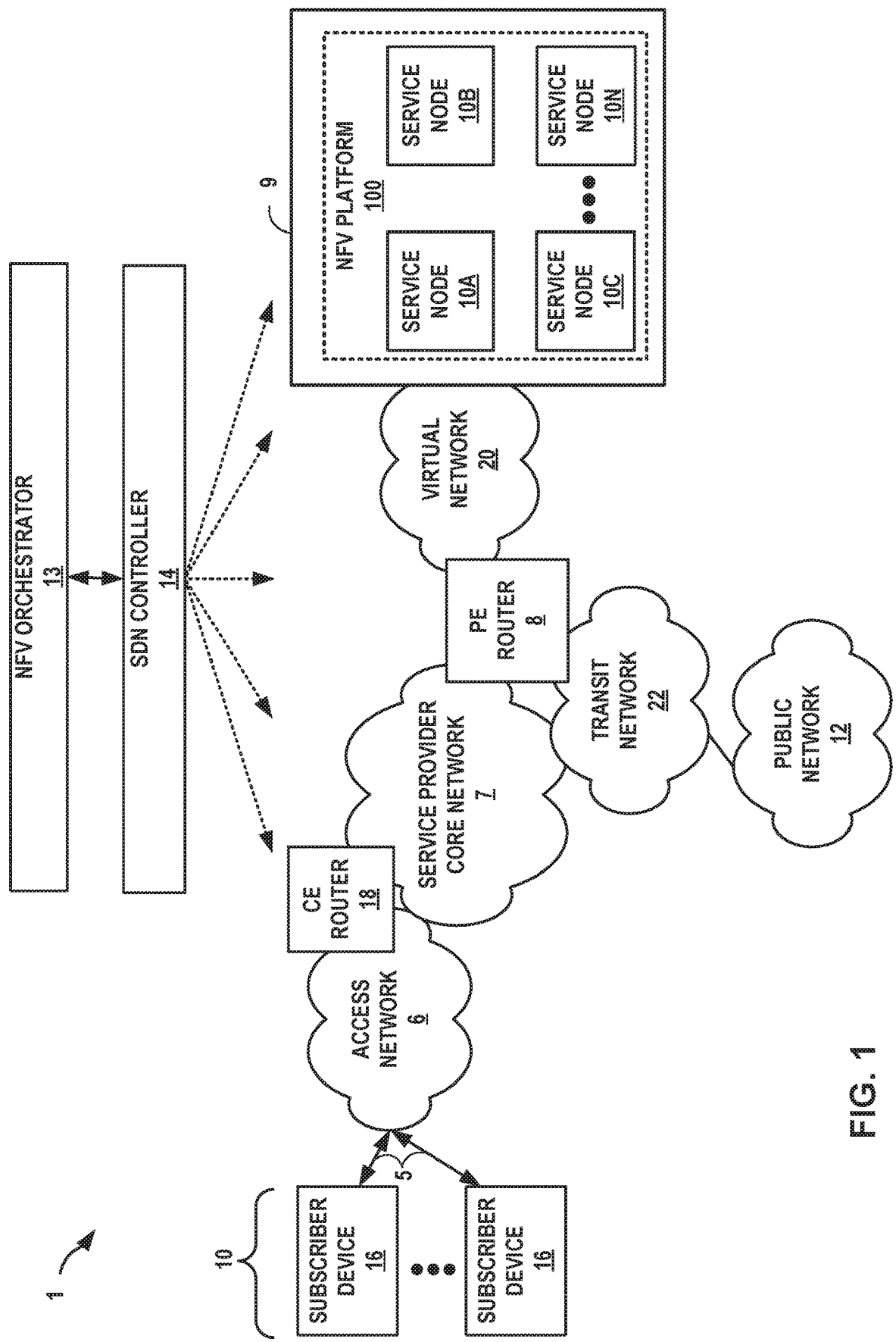
FIG. 1 is a block diagram illustrating an example network system including a software defined network (SDN)-network and network functions virtualization (NFV)-based network architecture, in accordance with techniques described herein.

FIG. 1 is a block diagram illustrating an example network system including an SDN- and NFV-based network architecture, in accordance with techniques described herein. The example network system 1 of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

As illustrated in FIG. 1, service provider network 2 comprises an SDN and NFV architecture. SDN controller 14 may provide a high-level controller for configuring and managing the routing and switching infrastructure of service provider network 2 (e.g., router 18, router 8, service provider core network 7, and data center 9). NFV orchestrator device 13 may provide a high-level orchestrator for configuring and managing NFV platform 100 that performs virtualization of network services into service nodes 10A-10N (collectively "service nodes 10") of data center 9.

In some instances, SDN controller 14 manages deployment of virtual machines (VMs) within the operating environment of data center 9. For example, SDN controller 14 may interact with router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

In the example of FIG. 1, service provider network 2 comprises access network 6 that provides connectivity to public network 12 via service provider core network 7 (hereinafter, "core network 7") and a router 8. Core network 7 and public network 12 provide packet-based services that are available for request and use by subscriber devices 16. As examples, core network 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

Subscriber devices 16 can connect to router 8 via access network 6 to receive connectivity to subscriber services for applications hosted by service nodes 10. A subscriber may represent, for instance, an enterprise, a residential subscriber, or a mobile subscriber. Subscriber devices 16 may be, for example, personal computers, laptop computers or other types of computing devices associated with subscribers. In addition, subscriber devices 16 may comprise mobile devices that access the data services of service provider network 2 via a radio access network (RAN) (not shown). Example mobile subscriber devices include mobile telephones, laptop or desktop computers having, e.g., a 3G wireless card, wireless-capable netbooks, video game devices, pagers, smart phones, personal data assistants (PDAs) or the like.

Each of subscriber devices 16 may run a variety of software applications, such as word processing and other office support software, web browsing software, software to support voice calls, video games, video conferencing, and email, among others. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric digital subscriber line (DSL) network, a Worldwide Interoperability for Microwave Access (WiMAX) network, a T-1 line, an Integrated Service Digital Network (ISDN), wired Ethernet, or a cellular radio link.

A network service provider operates, or in some cases leases, elements of access network 6 to provide packet transport between subscriber devices 16 and router 8. Access network 6 represents a network that aggregates data traffic from one or more of subscriber devices 16 for transport to/from core network 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Router 18 may be a customer edge (CE) router, a provider edge (PE) router, or other network device between access network 6 and core network 7. Core network 7 offers packet-based connectivity to subscriber devices 16 attached to access network 6 for accessing public network 12 (e.g., the Internet). Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent the Internet. Public network 12 may represent an edge network coupled to core network 7, e.g., by a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or other network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to access network 6, core network 7 may support multiple types of access network infrastructures that connect to service provider network access gateways to provide access to the offered services. In some instances, network system 1 may include subscriber devices 16 that attach to multiple different access networks 6 having varying architectures.

In general, any one or more of subscriber devices 16 may request authorization and data services by sending a session request to a gateway device such as router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward core network 7 in order to access and receive services provided by public network 12, and such packets may traverse router 8 as part of at least one packet flow. In some examples, router 18 may forward all authenticated subscriber traffic to public network 12, and router 8 may steer particular subscriber traffic to a data center 9 if the subscriber traffic requires services on service nodes 10. Applications (e.g., service applications) to be applied to the subscriber traffic may be hosted on service nodes 10.

As described herein, service provider network 2 includes a data center 9 having a cluster of service nodes 10 that provide an execution environment for the mostly virtualized network services. In some examples, each of service nodes 10 represents a service instance. Each of service nodes 10 may apply one or more services. As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

Although illustrated as part of data center 9, service nodes 10 may be network devices coupled by one or more switches or virtual switches of core network 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card or other network element or component.

Router 8 may steer individual subscriber packet flows through defined sets of services provided by service nodes 10. That is, in some examples, each subscriber packet flow may be forwarded through a particular ordered combination of services provided by service nodes 10, each ordered set being referred to herein as a "service chain." In the example of FIG. 1, subscriber packet flows may be directed along a service chain that includes any of service nodes 10. A particular service node 10 may support multiple service chains. Once processed at a terminal node of the service chain, i.e., the last service node 10 to apply services to packets flowing along a particular service path, the terminal node may direct the traffic back to router 8 for further processing and/or forwarding to public network 12. For example, traffic engineered service paths may start and terminate with router 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after router 18 has authenticated and established access sessions for the subscribers, router 18 or router 8 may direct packet flows for the subscribers along the appropriate service tunnels, thereby causing data center 9 to apply the requisite ordered services for the given subscriber. In some examples, SDN controller 14 may also provide a forwarding rule set to router 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow long the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

As described above, the services may include layer 4 to layer 7 services, such as SFW, DPI, CGNAT and TDF. Additionally, these services may refer to applications such as domain name service (DNS) applications, hypertext transfer protocol (HTTP) applications, and file transfer protocol (FTP) applications. In some examples, the disclosed TWAMP extensions may be used to measure service latency of DPI, a number of CGNAT flows, a number of TDF subscribers, or the liveliness of a DNS server or HTTP server.

In accordance with the techniques of the disclosure, NFV platform 100 includes a forwarding microchip that implements an NFV backplane, as will be discussed in more detail below. By virtualizing the network functions within NFV platform 100, NFV platform 100 allows the decoupling of network functions from physical hardware or silicon. Typically, the VNFs are executed by one or more virtual machines. The NFV backplane facilitates directing packet flows through the VNFs according to defined service chains by performing routing and/or switching and/or policy-based forwarding of packets amongst the VNFs as well as between the VNFs and one or more devices external to NFV platform 100. As described in detail below, the use of the forwarding microchip to implement the NFV backplane may obviate the requirement for a virtualized switch or a virtualized I/O interface positioned between the forwarding chip and the VNFs as par of the NFV backplane. Accordingly, the use of such a forwarding microchip to implement the NFV backplane for service chaining, as described herein, may simplify the implementation, configuration, and operation of NFV platform 100.

Figure 2:
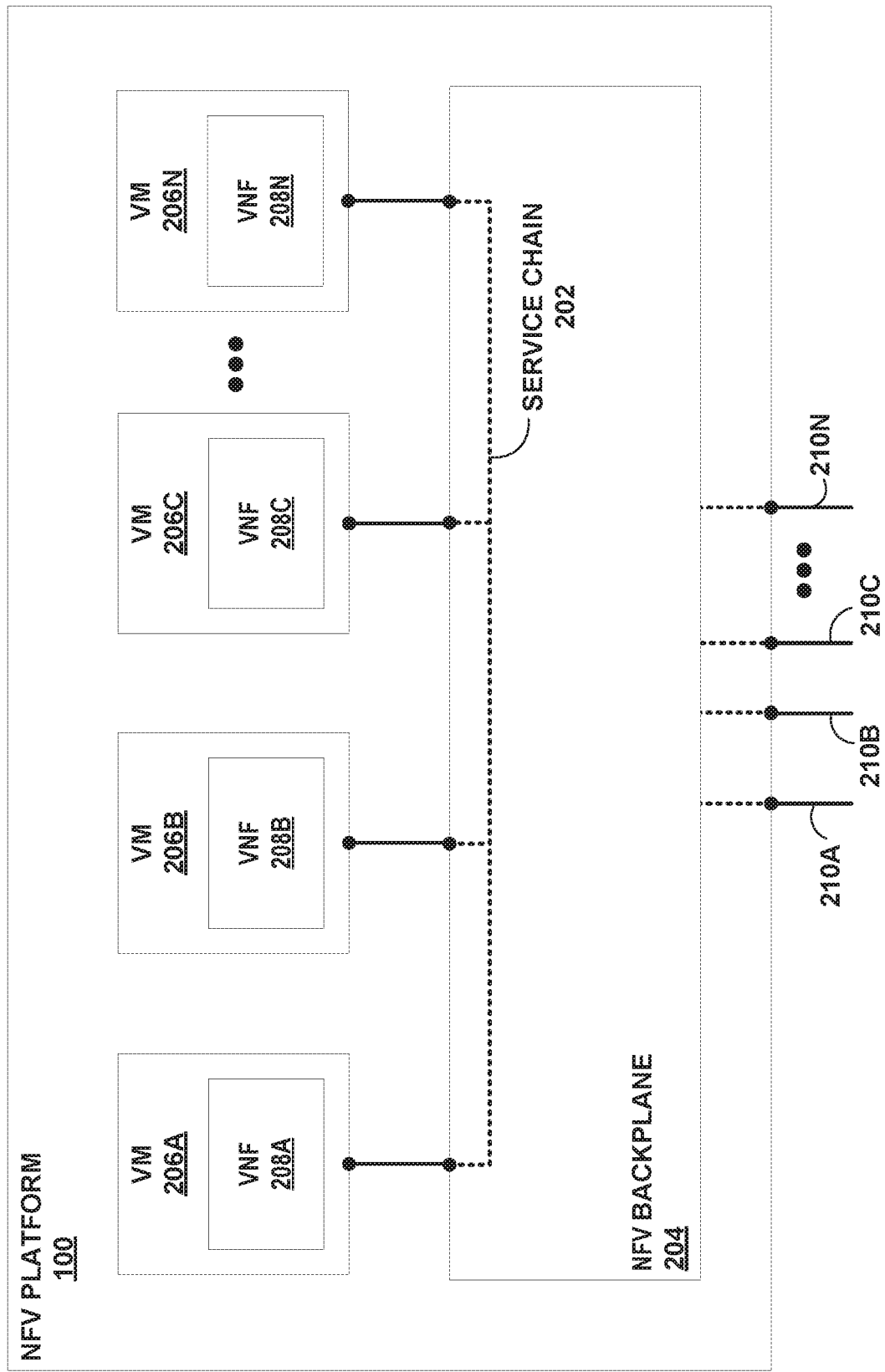
FIG. 2 is a block diagram illustrating an example of the NFV platform of FIG. 1 in further detail.

FIG. 2 is a block diagram illustrating an example of NFV platform 100 of FIG. 1 in further detail. NFV platform 100 includes NFV backplane 204 and virtual machines (VMs) 206A-206N (hereinafter, "VMs 206"). Each of VMs 206 implementing one of VNFs 208A-208N (hereinafter "VNFs 208"). In some examples, NFV platform 100 is a network device, such as a router or switch.

NFV is a technique for decoupling software network functions from physical hardware or silicon. The use of NFV allows for the use of VNFs 208 that are hardware-independent. For example, VMs 206 may implement VNFs 208, which provide network functions such as switching, routing, load-balancers, etc., while executing on commodity hardware. Customers receive numerous benefits from the use of NFV. For example, customers may mix and match the best-in-class network functions, sourced from multiple vendors. NFV allows the disaggregation of hardware and software architectures, avoiding vendor lock-in. NFV allows the use of cheaper commodity hardware, as opposed to expensive custom hardware, such as custom-built Application-specific Integrated Circuits (ASICs). Further, NFV allows for higher operational efficiency by enabling easier deployment and upgrade cycles.

Networking vendors also benefit from the use of NFV. For example, NFV allows for the use of modular hardware and software architectures. This translates to efficient development workflows and service rollout strategies. The use of NFV allows for easier collaboration with other industry players for complementary services and expansion into newer, adjacent market segments. NFV further enables easier integration with 3rd-party software. Additionally, NFV may allow for the use of innovative pricing models, which is enabled by the use of disaggregated hardware and software models.

With respect to FIG. 2, at the core of NFV platform 100 is NFV backplane 204. NFV backplane 204 provides a forwarding plane for directing traffic between VNFs 208 and virtual network 20 of FIG. 1. NFV backplane 204 provides provide fast, reliable connectivity among the VNFs 208. Further, NFV backplane 204 provides for the implementation of one or more flexible service chains 202 between VNFs 208. For example, NFV backplane may permit one of VNFs 208 to appear anywhere in service chain 202, any number of times. Further, NFV backplane 204 allows for the implementation of service chain 202 that permits, but does not require the use of a Service Forwarding Chain Header. Further, NFV backplane 204 allows multi-tenancy. Typically, the operation of NFV backplane 204 is transparent to both a user and an administrator.

NFV backplane 204 includes one or more physical network ports 210A-210N (hereinafter, "physical ports 210" or "physical network ports 210"). Physical ports 210 act as physical interfaces between one or more computing devices implementing NFV backplane 204 and one or more external devices, such as PE router 8 of FIG. 1. Physical ports 210 may comprise a specialized outlet to which a plug, cable, cord, or fiber optic adaptor connects. Physical ports 210 further may include one or more electrical conductors for transmitting and receiving electrical signals. In one example, physical ports 210 include one or more Ethernet ports. For example, NFV backplane 204 receives external traffic via physical ports 210 and forwards the traffic to VMs 206. As another example, NFV backplane 204 receives internal traffic from VMs 206 and forwards the traffic externally, e.g., to PE router 8 of FIG. 1, via physical ports 210.

Virtual machines 206 host corresponding VNFs 208. Each of VNFs 208 may represent an example network service instance of a service node 10 of FIG. 1. In some examples, a VM 206 may host one or more VNFs 208. Each VNF 208 implements a virtualized network service that is applied to packet flows. VNFs 208 represent software that may apply any one of the aforementioned network functions described above with respect to service nodes 10. VNFs 208 may be orchestrated by a controller, such as SDN controller 14, to be executed by a corresponding virtual machine 206 to apply the network service.

While illustrated and described with respect to virtual machines, VNFs 208 may be executed by other operating environments, such as containers (e.g., a DOCKER container). An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

Figure 3:
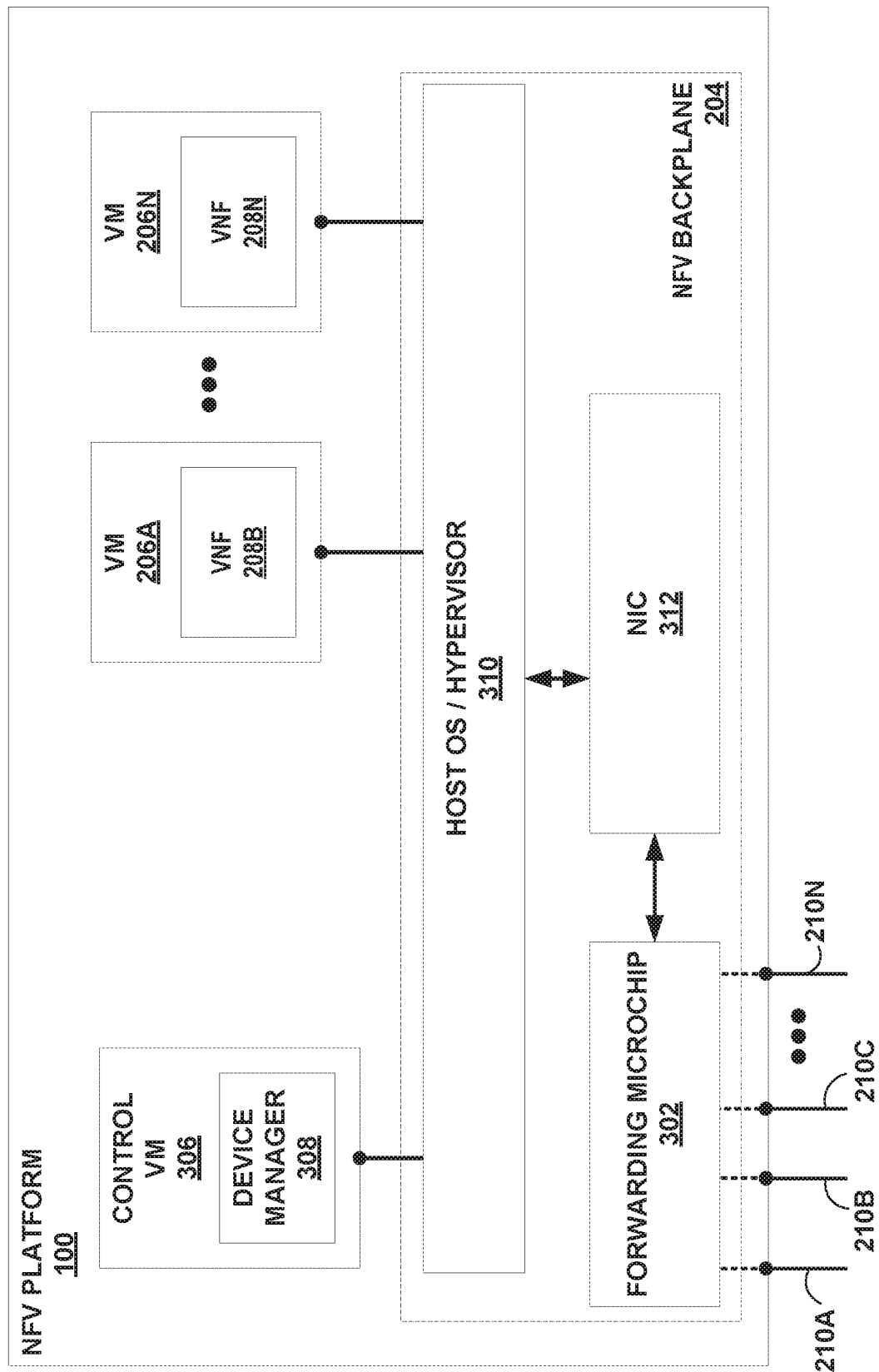
FIG. 3 is a block diagram illustrating a conceptual model of the NFV platform of FIG. 2.

FIG. 3 is a block diagram illustrating a conceptual model of NFV platform 100 of FIG. 2. Specifically, FIG. 3 depicts an example of the platform components of NFV platform 100. For example, as depicted in FIG. 3, NFV platform 100 includes Layer-2/Layer-3 forwarding microchip 302, NIC 312, host operating system (OS)/hypervisor 310, control VM 306, and VMs 206 that implement VNFs 208. VMs 206 and VNFs 208 may function in a substantially similar fashion to VMs 206 of FIG. 2. NFV platform 100, as depicted in FIG. 3, may represent a typical implementation of an NFV platform. In some examples, NFV platform 100 is a network device, such as a router or switch.

Forwarding microchip 302 implements a forwarding plane for directing packets to and from NFV platform 100. Forwarding microchip 302 includes physical ports 210, which may function in a substantially similar fashion to physical ports 210 of FIG. 2. Forwarding microchip 302 may be custom-built (e.g., an application-specific integrated circuit (ASIC)) or an off-the-shelf component procured from a vendor or merchant. In some examples, forwarding microchip 302 may be a software emulation of physical silicon or hardware.

NIC 312 implements switching functionality so as to connect VMs 206 to forwarding microchip 302. NIC 312 may operate as a Layer-1 (the physical layer of the OSI model) device to provide VMs 206 with physical access to a networking medium. Furthermore, NIC 312 may operate as a Layer-2 (the data link layer of the OSI model) device to provide a low-level addressing system through the use of MAC addresses that are uniquely assigned to network interfaces of VMs 206. In some examples, NIC 312 is a dual-port NIC. In some examples, NIC 312 is capable of Single-root input/output virtualization SR-IOV, while in other examples, NIC 312 is not capable of Single-Root Input/Output Virtualization (SR-IOV). NFV platform 100 implements internal Ethernet connectivity between forwarding microchip 302 and NIC 312. In some examples, the Ethernet connectivity is on the order of 10 Gigabit Ethernet or greater.

NFV platform 100 further includes Control VM 306 that executes device manager 308. Device manager 308 hosts management and Layer-2/Layer-3 control plane software for forwarding microchip 302. Device manager 308 also implements the packet I/O for a path between host OS/hypervisor 310 and forwarding microchip 302.

Host OS and hypervisor 310 manages NIC 312 and VMs 206 that implement VNFs 208 to enable NFV. Example hypervisors include Kernel-based Virtual Machine (KVM) for the Linux kernel OS, Xen, ESXi available from VMware, Windows Hyper-V available from Microsoft, and other open-source and proprietary hypervisors.

Figure 4:
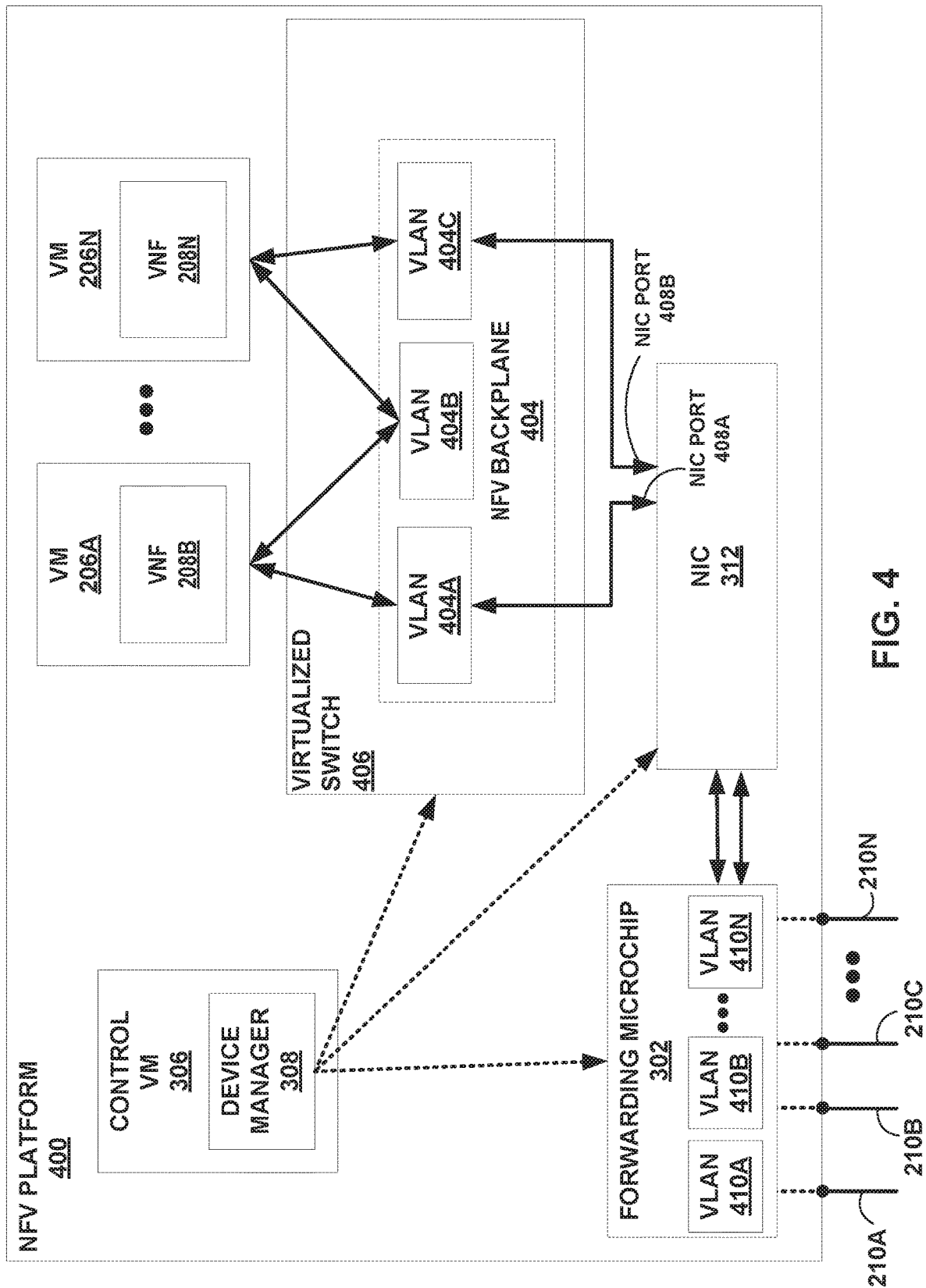
FIG. 4 is a block diagram illustrating an example implementation of an NFV platform that uses a virtualized switch to implement an NFV backplane.

FIG. 4 is a block diagram illustrating an example implementation of NFV platform 400 that uses virtualized switch 406 to implement NFV backplane 404. In some examples, NFV platform 400 is an example implementation of NFV platform 100 of FIG. 2.

In this example, virtualized switch 406 is positioned between NIC 312 and VM 206 and is used to implement Layer-2, Layer-3, and/or policy-based service chains using VLANs 404 created within virtualized switch 406. In some examples, virtualized switch 406 is Open vSwitch.

Virtualized switch 406 connects virtual NICS of VMs 206 (not depicted in FIG. 4) and the front-panel physical ports 210 via NIC ports 408A-408B (hereinafter, "NIC ports 408"). In some examples, virtualized switch 406 executes in a kernel space, while in other examples, virtualized switch 406 executes in a user space. For example, where virtualized switch 406 is Open vSwitch, virtualized switch 406 may be configured using the Data Plane Development Kit (DPDK) software application available from www.dpdk.org.

As shown in the FIG. 4, VLANs 410A-410N (hereinafter, "VLANs 410") are created in forwarding microchip 302 for forwarding packets, while virtual Local Area Networks (VLANs) 404A-404C (hereinafter "VLANs 404") are created in virtualized switch 406 to create different service chains for different traffic flows between VNFs 208. NIC 312 may use a VLAN tag of a received network packet to associate the network packet with a corresponding VLAN 404. In some examples, a controller, such as SDN controller 14 of FIG. 1, may be used to create traffic-steering policies in virtualized switch 406 to implement service chains. Such a controller may be, e.g., OpenFlow Agent.

However, NFV platform 400, as depicted in FIG. 4, may suffer from numerous problems. For example, the operation of virtualized switch 406 in NFV backplane 404 is not transparent to the user. This means that an administrator must explicitly configure VLANs 404, IP addresses, and policies using a command-line interface (CLI) for virtualized switch 406 or with a management protocol such as Open vSwitch Database Management Protocol (OVSDB). Neither of these applications are typically native to the underlying platform (e.g., NFV backplane 404). Thus, NFV platform 400 as depicted in FIG. 4 may require the user to manage a second networking system from a second vendor to configure NFV backplane 404, which may cause administrative and compatibility issues. Further, NFV backplane 404, as depicted in FIG. 4, requires the use of a controller, such as SDN controller 14 or OpenFlow Agent, to implement policy-based service chains. Additionally, due to the complexity of NFV backplane 404, NFV platform 400 may be prone to misconfigurations that can lead to packet-path loops between forwarding microchip 302 and virtualized switch 406. This may result in broadcast storms that consume large amounts of computing resources. Furthermore, achieving a coherent end-to-end Quality of Service (QoS) and flow control with NFV platform 400 may be difficult and cumbersome due to the implementation of diverse systems with varying capabilities.

Figure 5:
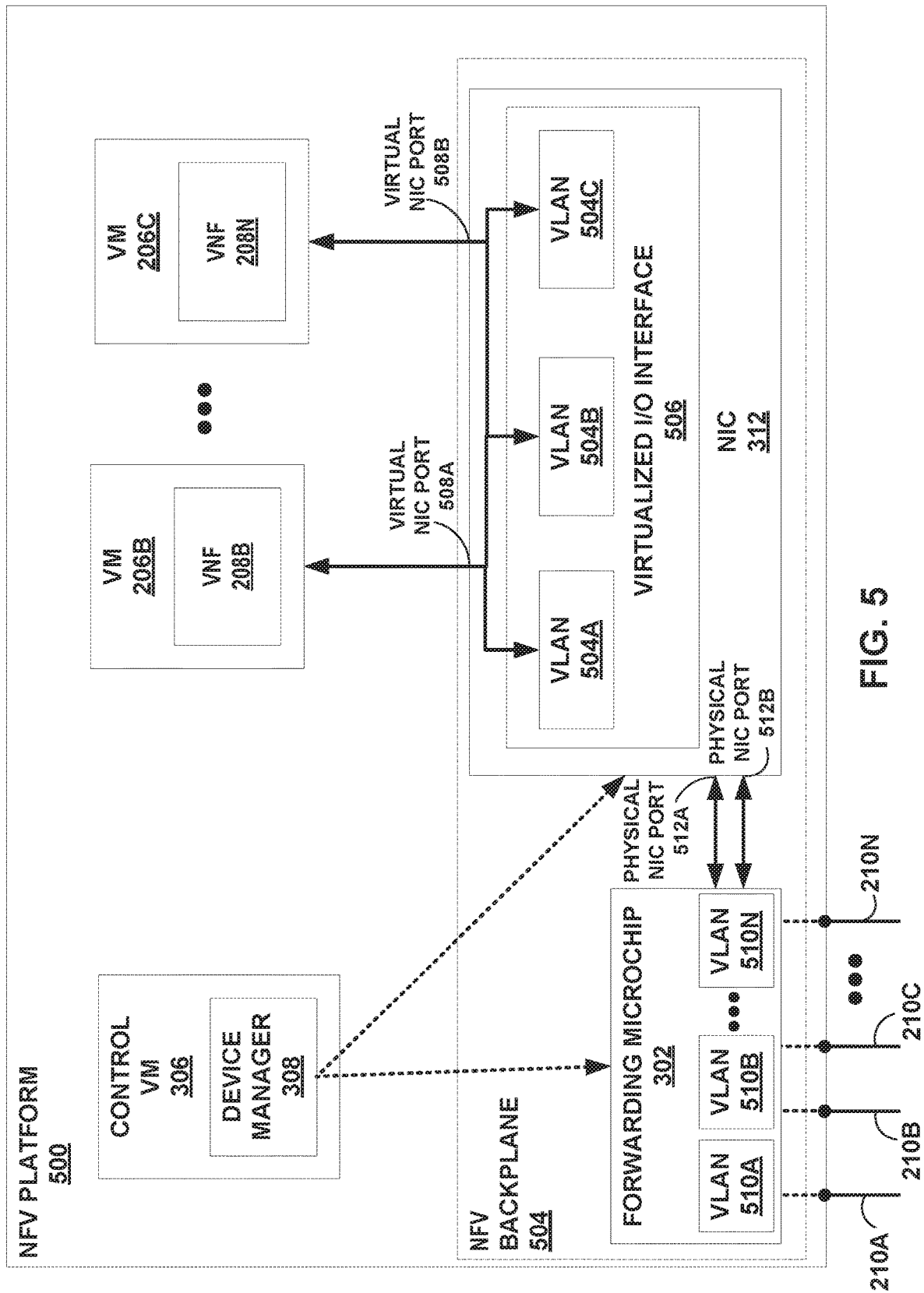
FIG. 5 is a block diagram illustrating an example implementation of an NFV platform that uses a virtualized I/O interface to implement an NFV backplane.

FIG. 5 is a block diagram illustrating an example implementation of NFV platform 500 that uses virtualized I/O interface 506 to implement NFV backplane 504. As an alternative to the use of virtualized switch 406 in NFV backplane 404 as depicted in FIG. 4, virtualized I/O interface 506 may be used in NFV backplane 504 to provide multiple Virtual Functions (VFs) on one or more virtual NIC ports 508A-508B (hereinafter, "virtual NIC ports 508") that can be used to connect to virtual NICs of VMs 206. VLANS 504A-504C (hereinafter "VLANs 504") are created in virtualized I/O interface 506 and VLANs 510A-510N (hereinafter, "VLANs 510") are created in forwarding microchip 302 to create different service chains for different traffic flows between VNFs 208.

In some examples, virtualized I/O interface 506 is SR-IOV. Typically, NIC 312 may include an internal switch (not depicted) that connects one or more physical NIC ports 512A-512B (hereinafter, "physical NIC ports 512") to one or more virtual NIC ports 508. The internal switch is similar to virtualized switch 406 described in FIG. 4, but is implemented in hardware. Thus, such an internal switch may be far less capable with respect to supported features. NIC 306 may implement virtualized I/O interface 506 to extend the functionality of such an internal switch.

However, NFV platform 500 may also suffer from numerous problems. For example, example NFV platform 500 depicted in FIG. 5 requires NIC 312 to have virtualized I/O interface (e.g., SR-IOV) capability so as to implement virtualized I/O interface 506. Typically, NICs that support such capability are more complex and more expensive than NICs that do not. Furthermore, each VNF 208 is required to support SR-IOV with a driver version that is compatible with a driver in the host OS. Thus, NFV platform 500, as depicted in FIG. 5, may be less practical for deployment because few commercial VNFs support SR-IOV.

Furthermore, similar to NFV platform 400 of FIG. 4, the use of a virtualized I/O interface, such as SR-IOV, is not transparent to the user when implementing service chains in NFV backplane 504. Further, the use of virtualized I/O interface 506 may be less desirable than the use of virtualized switch 406 of FIG. 4 because the user may have little or no visibility, control, or debuggability of the internal hardware switch in NIC 312. Like NFV backplane 404 of FIG. 4, NFV backplane 504 may be prone to misconfigurations that can lead to packet loops between NIC 312 and forwarding microchip 302. Furthermore, implementing end-to-end flow control may be cumbersome or difficult to the administrator. For example, if several VNFs 208 in a service chain support SR-IOV but other VNFs 208 do not, then NFV platform 500 would require both virtualized I/O interface 506 as well as a virtualized switch such as virtualized switch 406 of FIG. 4, thus further increasing the complexity of NFV backplane 504.

Figure 6:
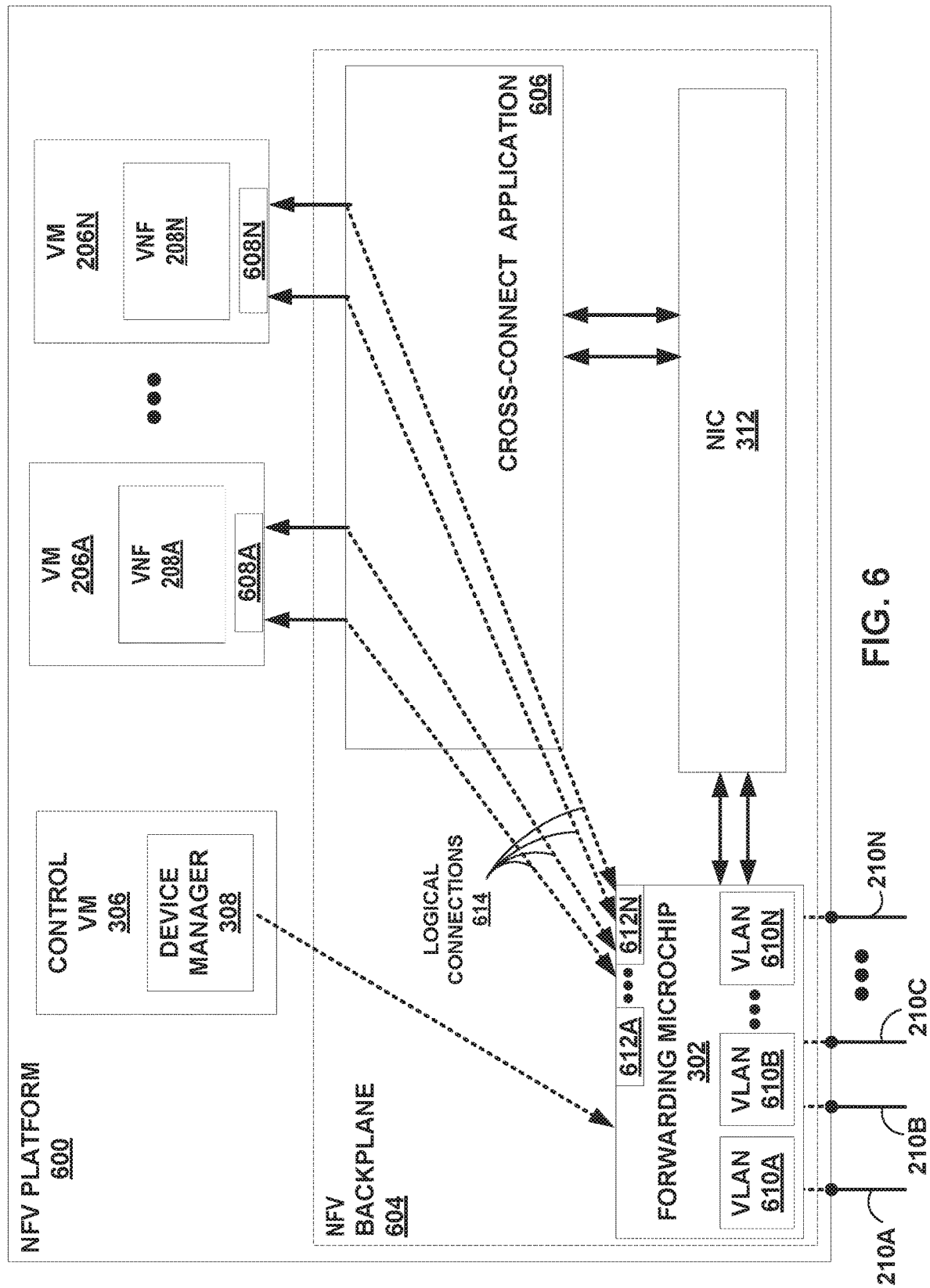
FIG. 6 is a block diagram illustrating an example implementation of an NFV platform that uses a forwarding microchip to implement an NFV backplane in accordance with the techniques of the disclosure.

FIG. 6 is a block diagram illustrating an example implementation of NFV platform 600 that uses forwarding microchip 302 to implement NFV backplane 604 in accordance with the techniques of the disclosure. In some examples, NFV platform 600 is an example implementation of NFV platform 100 of FIG. 2. In some examples, NFV platform 600 is a network device, such as a router or switch. Like NFV platforms 400 and 500 of FIGS. 4 and 5, respectively, NFV platform 600 may operate like NFV platform 100 of FIGS. 2 and 3 to virtualize the network functions provided by data center 9 of FIG. 1. By virtualizing such network functions within NFV platform 600, NFV platform 600 allows the decoupling of network functions from physical hardware or silicon of data center 9 of FIG. 1.

In accordance with the techniques of the disclosure, NFV platform 600 includes forwarding microchip 302. The functionality of forwarding microchip 302 is extended to also serve as NFV backplane 604. NFV backplane 604 supports VNFs 208 by performing forwarding of packets, via routing, switching and/or ACLs, amongst VNFs 208 as well as between VNFs 208 and one or more devices external to NFV platform 600. By using forwarding microchip 302 to implement NFV backplane 604, NFV platform 600 may eliminate the need for a foreign component to implement the NFV backplane. For example, NFV platform 600 may obviate the requirement of either a virtualized switch (e.g., virtualized switch 406 of NFV platform 400 of FIG. 4) or a virtualized I/O interface (e.g., virtualized I/O interface 506 of NFV platform 500 of FIG. 5). Accordingly, the use of forwarding microchip 302 may simplify the implementation, configuration, and operation of NFV platform 600.

With respect to FIG. 6, NFV backplane 604 provides a forwarding plane for directing traffic between VNFs 208 and virtual network 20 of FIG. 1. NFV backplane 604 provides provide fast, reliable connectivity among the VNFs 208. Further, NFV backplane 604 provides for the implementation of one or more flexible service chains between VNFs 208. For example, NFV backplane may permit one of VNFs 208 to appear anywhere in a service chain, any number of times. Further, NFV backplane 604 allows for the implementation of a service chain that permits, but does not require the use of a Service Forwarding Chain Header. Further, NFV backplane 604 allows multi-tenancy. Typically, the operation of NFV backplane 604 is transparent to both a user and an administrator.

Virtual machines 206 host corresponding VNFs 208. Each of VNFs 208 may represent an example network service instance of a service node 10 of FIG. 1. In some examples, a VM 206 may host one or more VNFs 208. Each VNF 208 implements a virtualized network service that is applied to packet flows. VNFs 208 represent software that may apply any one of the aforementioned network functions described above with respect to service nodes 10. VNFs 208 may be orchestrated by a controller, such as SDN controller 14 of FIG. 1, to be executed by a corresponding virtual machine 206 to apply the network service.

While illustrated and described with respect to virtual machines, VNFs 206 may be executed by other operating environments, such as containers (e.g., a DOCKER container). An operating system kernel (not shown in FIG. 6) may execute in kernel space and may include, for example, a Linux, Berkeley Software Distribution (BSD), another Unix-variant kernel, or a Windows server operating system kernel, available from Microsoft Corp.

Forwarding microchip 302 implements a forwarding plane for directing packets to and from NFV platform 600. Forwarding microchip 302 may be custom-built (e.g., an application-specific integrated circuit (ASIC)) or an off-the-shelf component procured from a vendor or merchant. In some examples, forwarding microchip 302 may be a software emulation of physical silicon or hardware.

Forwarding microchip 302 includes physical ports 210, which may function in a substantially similar fashion to physical ports 210 of FIG. 2. For example, Physical ports 210 act as physical interfaces between one or more computing devices implementing NFV platform 600 and one or more external devices, such as PE router 8 of FIG. 1. Physical ports 210 may comprise a specialized outlet to which a plug, cable, cord, or fiber optic adaptor connects. Physical ports 210 further may include one or more electrical conductors for transmitting and receiving electrical signals. In one example, physical ports 210 include one or more Ethernet ports.

NIC 312 implements switching functionality so as to connect VMs 206 to forwarding microchip 302. NIC 312 may operate as a Layer-1 (the physical layer of the OSI model) device to provide VMs 206 with physical access to a networking medium. Furthermore, NIC 312 may operate as a Layer-2 (the data link layer of the OSI model) device to provide a low-level addressing system through the use of MAC addresses that are uniquely assigned to network interfaces of VMs 206. In some examples, NIC 312 is a dual-port NIC. In some examples, NIC 312 is capable of Single-root input/output virtualization SR-IOV, while in other examples, NIC 312 is not capable of Single-Root Input/Output Virtualization (SR-IOV). NFV platform 600 implements internal Ethernet connectivity between forwarding microchip 302 and NIC 312. In some examples, the Ethernet connectivity is on the order of 10 Gigabit Ethernet or greater.

NFV platform 600 further includes Control VM 306 that executes device manager 308. Device manager 308 hosts management and Layer-2/Layer-3 control plane software for forwarding microchip 302.

In accordance with the techniques of the disclosure, the functionality of forwarding microchip 302 is extended to serve as NFV backplane 604, thereby eliminating the need for a foreign component to implement the NFV backplane. As shown in FIG. 6, forwarding microchip 302 provides a plurality of "virtual" or "loop-back" ports 612A-612N (hereinafter, "virtual ports 612"). Virtual ports 612 are ports internal to NFV platform 600 and are conventionally used to implement tunnels like GRE, VxLAN, etc. Virtual ports 612 are first-class ports from a user-configuration and feature capability perspective in that virtual ports 612 have functionality and feature-capabilities that are comparable to front-panel physical ports 210 of forwarding microchip 302. For example, a user may add a virtual port 612 to a VLAN, configure an IP address on a virtual port 612, or apply ACLs on a virtual port 612. Further, forwarding microchip 302 typically does not distinguish between virtual ports 612 and physical ports 210 while forwarding packets. For external connectivity, packets on a virtual port 612 are associated with one or more physical ports 210. This association is dynamic and determined at run-time, based on the packet header and the results of switching, routing, or policy rules as configured on the virtual port 612. Typical use cases for virtual ports 612 are implementations of tunnels, such as GRE and VXLAN, where the virtual ports 612 may be used for tunnel encapsulation or decapsulation. The techniques of the disclosure exploit virtual ports 612 to implement an NFV backplane.

In the example of FIG. 6, each of virtual NIC ports 608A-608N (hereinafter, "virtual NIC ports 608") of VNFs 208 has a reserved virtual port 612 on forwarding microchip 302. Forwarding microchip 302 can use Layer-2 switching, Layer-3 routing, policies, or Access Control Lists (ACLs) to transfer packets between virtual ports 612 and the corresponding virtual NIC ports 608. Forwarding microchip 302 establishes logical connection 614 between each virtual port 612 and corresponding virtual NIC port 608. A user may configure a virtual port 612 in a similar fashion to a physical, front-panel port 210. For example, the user may add a virtual port 612 to a VLAN, assign an IP address to the virtual port 612, or configure one or more ACLs on the virtual port 612, etc.

VLANs 610A-610N (hereinafter, "VLANs 610") are created in forwarding microchip 302 to create different service chains for different traffic flows between VNFs 208. Further, for each pair comprising a virtual port 612 of forwarding microchip 302 and a virtual port 608 of a VM 206, the pair may be allocated a unique VLAN-ID. In some examples, virtual ports 612 of forwarding microchip 302 may be internally configured for IEEE 802.1ad (Q-in-Q) operation to add an associated VLAN tag to a packet on egress from forwarding microchip 302 to NIC 312, and strip the associated VLAN tag on ingress from NIC 312.

The packet path from a front-panel physical port 210 of forwarding microchip 302 to a virtual NIC port 608 is set forth as follows. For the receive path, a front-panel, physical port (e.g., physical port 210A) of forwarding microchip 302 receives a packet. The packet can be untagged or VLAN-tagged. Forwarding microchip 302 processes the packet as is done conventionally. If an egress virtual port (e.g., virtual port 612A), as determined by the packet lookup, is a virtual port, forwarding microchip 302 adds the corresponding VLAN tag to the packet and forwards the packet to NIC 312.

NIC 312 receives the packet and forwards the packet to cross-connect application 606 (e.g., DPDK). Cross-connect application 606 performs a look-up on the outer VLAN-ID and determines a virtual NIC port 608 for the packet (e.g., virtual NIC port 608A). The cross-connect application strips the outer VLAN ID and forwards the packet to virtual NIC port 608A.

For the transmit path, cross-connect application 606 (e.g., DPDK) receives a packet from a virtual NIC port (e.g., virtual NIC port 608A). Cross-connect application 606 adds a VLAN ID corresponding to virtual NIC port 608A to the packet and forwards the packet to forwarding microchip 302 via NIC 312. Forwarding microchip 302 uses the outer VLAN ID to associate the packet with the correct virtual port 612 (e.g., virtual port 612A), strips the outer VLAN ID from the packet, and then processes the packet as is done conventionally. The packet exits via a front-panel, physical port 210 (e.g., physical port 210A) of forwarding microchip 302, physical port 210A determined by the packet lookup. As non-exclusive examples, virtual NIC ports 608 may be virtio, vhost-net, vhost-user or veth-pair (for Linux Containers).

The techniques of the disclosure provide specific technical advantages to the field of computer networking and network traffic routing. For example, the NFV blackplane implemented by NFV platform 600 is feature-rich, in that the NFV backplane inherits all of the features of forwarding microchip 302, such as Layer-2/Layer-3 protocols, ACLs, counters, QoS, etc. These features come with no additional cost and are all configured in a homogenous manner using a native CLI and/or other configuration mechanisms. Further, the NFV blackplane implemented by NFV platform 600 described herein is transparent to the user and administrator and cross-connect application 606 is not required to be maintained by the user. For example, virtual ports 612 of forwarding microchip 302 may be configured in a similar fashion to regular, physical ports 210 using a native CLI and/or other configuration methods. Additionally, because the NFV backplane implemented by NFV platform 600 is automatically configured at initialization, the techniques of the disclosure substantially reduce the likelihood and frequency of misconfiguration. Furthermore, the techniques of the disclosure eliminate the occurrence of packet loops because there is only a single Layer-2 forwarding switch. The techniques of the disclosure further allow for using the Virtual Router Forwarding (VRF) and Virtual Switch capabilities of forwarding microchip 302 to implement multi-tenant service chains. The techniques of the disclosure also simplify implementation of QoS because virtual ports 612 support multi-field classifiers, output queues, and queue-schedulers. The techniques of the disclosure also permit the use of flexible service chains by allowing any service to occur at any point in the service chain, any number of times.

Figure 7:
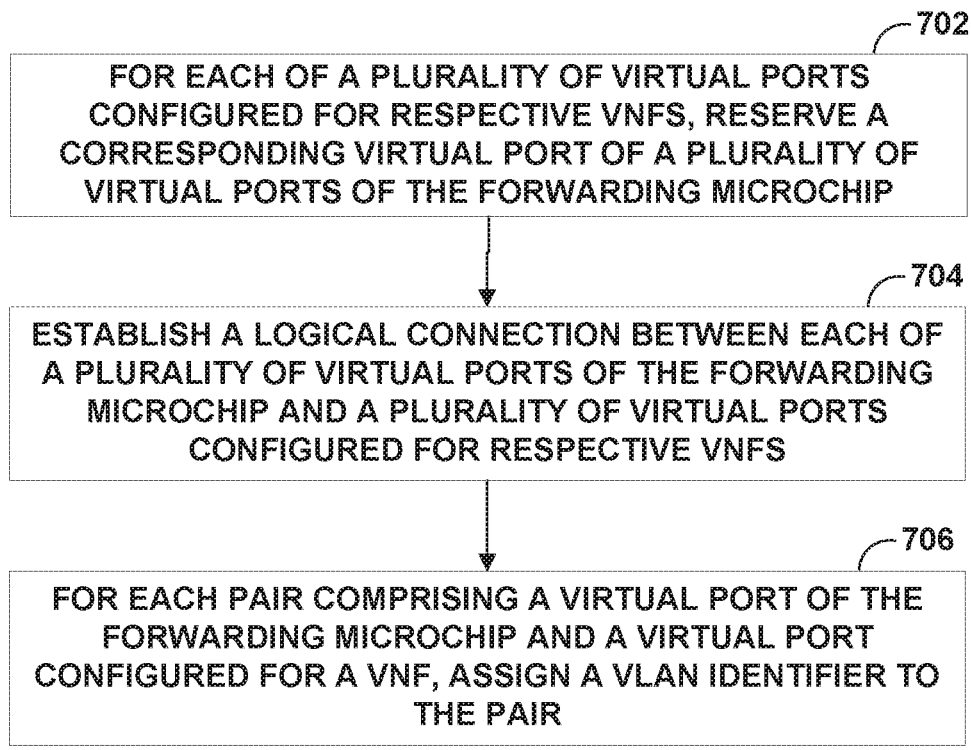
FIG. 7 is a flowchart illustrating an example operation for using a forwarding microchip to implement an NFV backplane in accordance with the techniques of the disclosure.

FIG. 7 is a flowchart illustrating an example operation for using a forwarding microchip to implement an NFV backplane in accordance with the techniques of the disclosure. Specifically, FIG. 7 illustrates an example for using the forwarding microchip to establish the NFV backplane. For convenience, FIG. 7 is described with respect to FIGS. 1 and 6.

With respect to the example of FIG. 7, forwarding microchip 302 reserves, for each of a plurality of virtual ports 608 configured for respective VNFs 208, a corresponding virtual port 612 of forwarding microchip 302 (702). For example, forwarding microchip 302 reserves virtual port 612A for virtual port 608A configured for VNF 208A.

Forwarding microchip 302 further establishes a logical connection between each of the plurality of virtual ports 608 configured for respective VNFs 208 and the corresponding virtual ports 612 of forwarding microchip 302 (704). For example, for each pair of virtual ports comprising a virtual port 608 and a virtual port 612, forwarding microchip 302 creates a VLAN 610. Further, forwarding microchip 302 assigns to each pair of virtual ports comprising a virtual port 608 and a virtual port 612 a unique VLAN ID (706). In some examples, forwarding microchip 302 may configure virtual ports 612 for IEEE 802.1ad (Q-in-Q) operation. Thus, (as is described in more detail with respect to FIGS. 8 and 9), forwarding chip 302 may add an associated VLAN tag to a packet on egress from forwarding microchip 302 to NIC 312, and strip the associated VLAN tag on ingress from NIC 312. The use of VLANs 610 may allow forwarding microchip 302 to create logical connections between each of the plurality of virtual ports 608 configured for respective VNFs 208 and the corresponding virtual ports 612 of forwarding microchip 302. The use of VLANs 610 may further allow the creation of different service chains for different traffic flows between VNFs 208.

Figure 8:
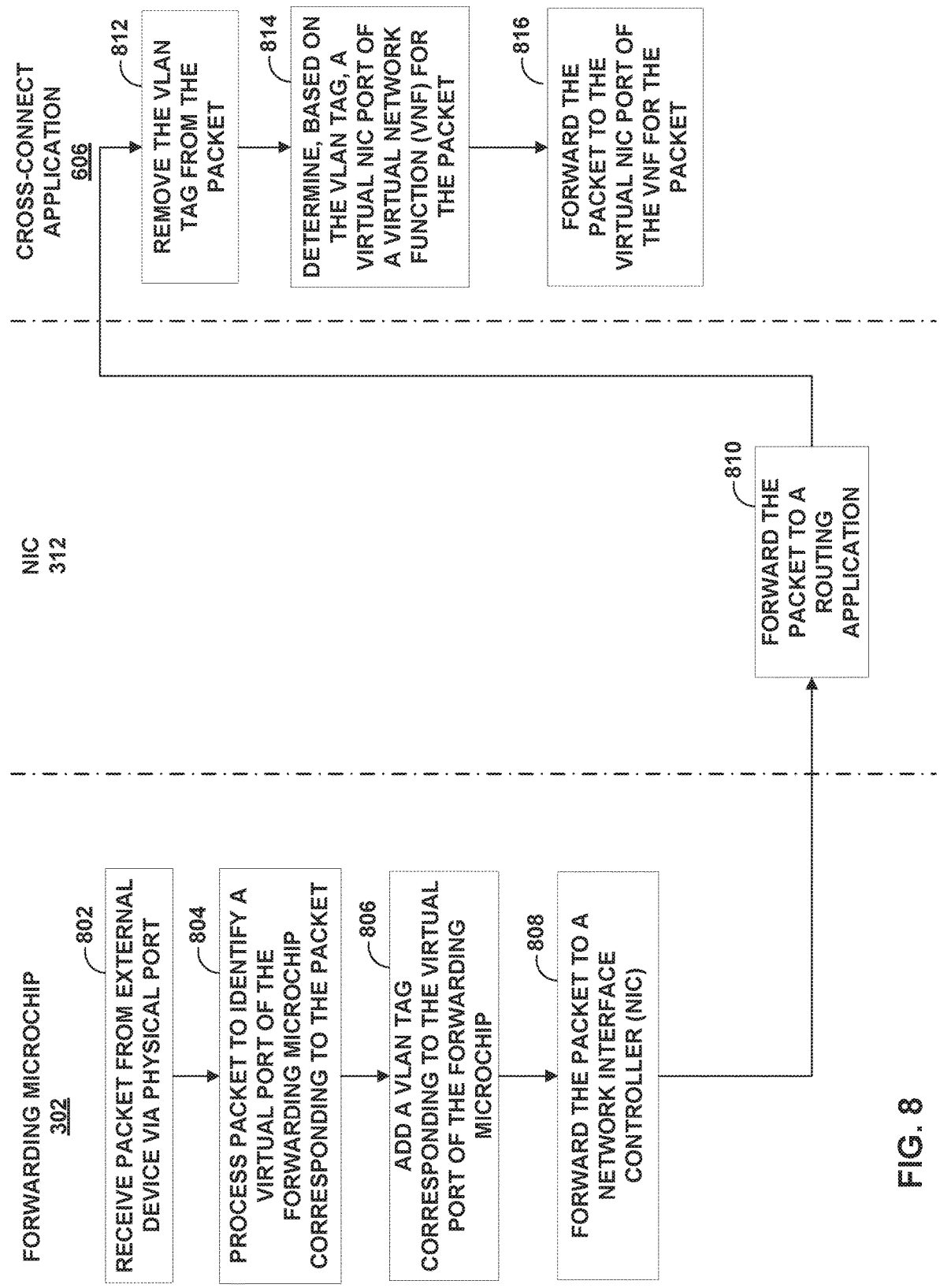
FIG. 8 is a flowchart illustrating an example operation for using a forwarding microchip to implement an NFV backplane in accordance with the techniques of the disclosure.

FIG. 8 is a flowchart illustrating an example operation for using a forwarding microchip to implement an NFV backplane in accordance with the techniques of the disclosure. Specifically, FIG. 8 illustrates an example for using the NFV backplane to process packets received from an external device and destined for an internal VNF. For convenience, FIG. 8 is described with respect to FIGS. 1 and 6.

With respect to the example of FIG. 8, forwarding microchip 302 receives a packet from an external device (e.g., PE router 8 of FIG. 1) via one of physical ports 210 (802) and performs packet look-up to identify a next hop for the packet. Forwarding microchip 302 processes the packet to identify a virtual port 612 (e.g., virtual port 612A) of forwarding microchip 302 corresponding to the packet (804). Forwarding microchip 302 adds an outer VLAN tag to the packet corresponding to the identified virtual port 612 (e.g., virtual port 612A) (806) and forwards the packet to NIC 312 (808), which in turn forwards the packet to cross-connect application 606 (810).

Cross-connect application 606 removes the outer VLAN tag from the packet (812). Further, cross-connect application 606 performs packet look-up on the outer VLAN tag to determine a virtual NIC port 612 (e.g., virtual NIC port 608A), corresponding to the outer VLAN tag (814). Cross-connect application 606 forwards the packet to virtual NIC port 608A.

Figure 9:
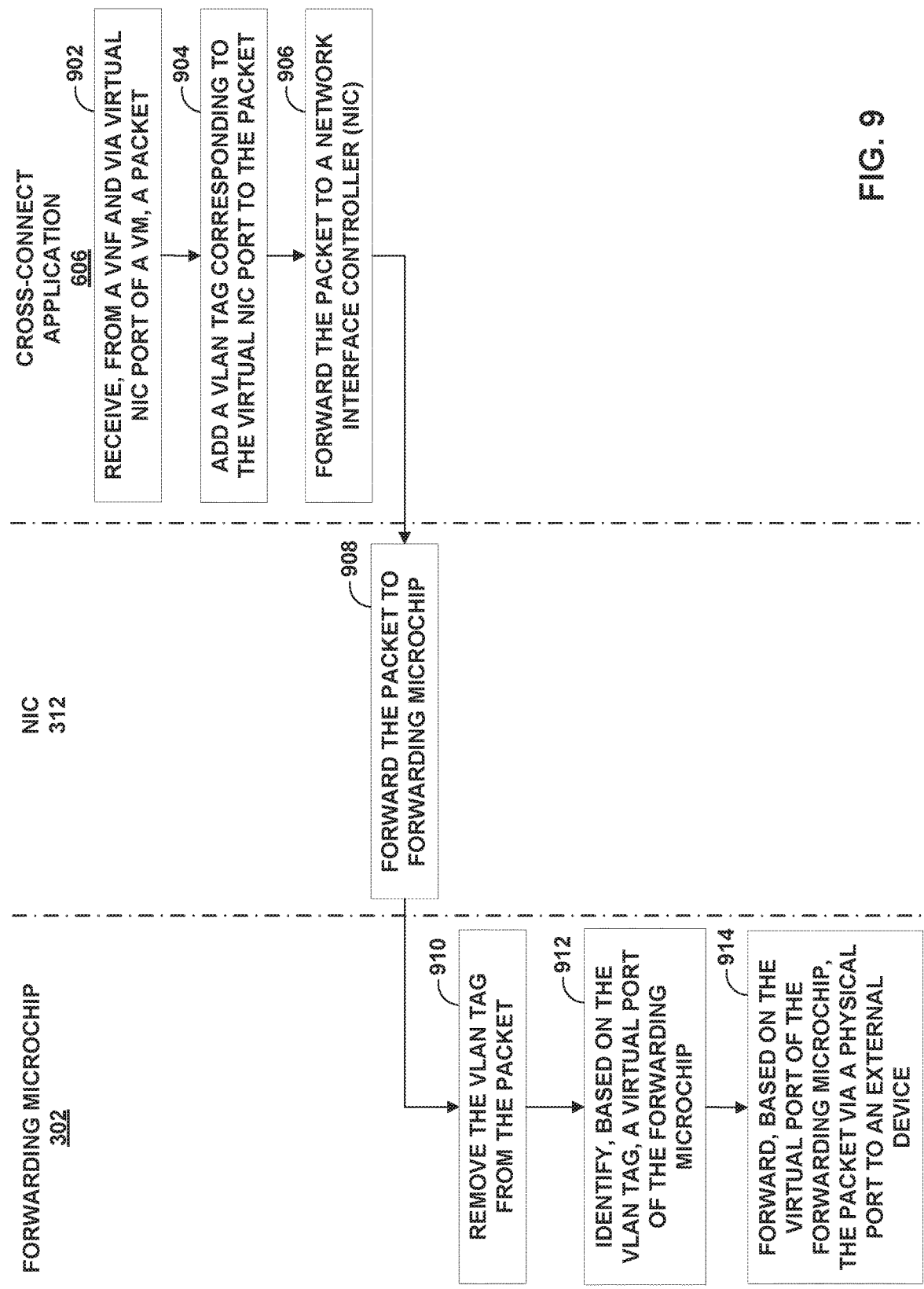
FIG. 9 is a flowchart illustrating an example operation for using a forwarding microchip to implement an NFV backplane in accordance with the techniques of the disclosure.

FIG. 9 is a flowchart illustrating an example operation for using a forwarding microchip to implement an NFV backplane in accordance with the techniques of the disclosure. Specifically, FIG. 9 illustrates an example for using the NFV backplane to process packets received from an internal VNF and destined for an external device. For convenience, FIG. 9 is described with respect to FIGS. 1 and 6.

With respect to the example of FIG. 9, cross-connect application 606 receives a packet from one of VNFs 208 (e.g., VNF 208A) via a virtual NIC port (e.g., virtual NIC port 608A) (902). Cross-connect application 606 processes the packet to identify a VLAN corresponding to the virtual port 612 and adds an outer VLAN tag corresponding to the virtual port 612 (904). Cross-connect application 606 forwards the packet to NIC 312 (906), which in turn forwards the packet to forwarding microchip 302 (908).

Forwarding microchip 302 receives the packet and removes the VLAN tag from the packet (910). Forwarding microchip 302 identifies, based on the VLAN tag, a virtual port 612 of forwarding microchip 302 corresponding to the VLAN tag (e.g., virtual port 612A) (912). Forwarding microchip 302 further processes the packet to identify a next hop for the packet and forwards the packet via one of physical ports 210 to an external device (e.g., PE router 8 of FIG. 1) (914).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
configuring a network functions virtualization (NFV) backplane within a network device, wherein the network device comprises:
a chassis comprising one or more external-facing physical ports;
a forwarding microchip housed by the chassis and physically linked to each of the one or more external-facing physical ports of the chassis;
a Network Interface Controller (NIC) housed by the chassis and communicatively coupled to the forwarding microchip within the chassis via a physical communication link; and
processing circuitry housed by the chassis, wherein the processing circuitry is configured to execute a plurality of software-implemented virtual network functions (VNFs);
wherein configuring the NFV backplane within the network device comprises configuring the forwarding microchip with a plurality of virtual ports for forwarding Virtual Local Area Network (VLAN)-tagged packets over the physical communication link to the NIC by assigning respective VLAN identifiers to pairs of the plurality of virtual ports of the forwarding microchip and a plurality of virtual ports configured for respective VNFs of the plurality of VNFs;
receiving, by the forwarding microchip, first packets via the one or more external-facing physical ports of the chassis;
attaching, by the forwarding microchip and based on a determination that the first packets are associated with a first VNF of the plurality of VNFs, a first VLAN identifier to the first packets, the first VLAN identifier assigned to a first pair, of the pairs, that is a first virtual port of the plurality of virtual ports of the forwarding microchip and a second virtual port of the plurality of virtual ports configured for the respective VNFs, the second virtual port configured for the first VNF;
forwarding, by the forwarding microchip and via the first virtual port and the physical communication link with the NIC, the first packets to the NIC; and forwarding, by the NIC and based on the first VLAN identifier, the first packets to the second virtual port for the first VNF for processing by the first VNF;
receiving, by the forwarding microchip, via the first virtual port and the physical communication link with the NIC, second packets originating from the second virtual port for the first VNF, wherein the first VLAN identifier is attached to the second packets;
removing, by the forwarding microchip, the first VLAN identifier from the second packets; and
forwarding, by the forwarding microchip and via the one or more external-facing physical ports of the chassis, the second packets.

2. The method of claim 1, wherein assigning the respective VLAN identifiers to the pairs of the plurality of virtual ports of the forwarding microchip and the plurality of virtual ports configured for the respective VNFs of the plurality of VNFs comprises:
for each of the plurality of virtual ports configured for the respective VNF of the plurality of VNFs, reserving a corresponding virtual port of the plurality of virtual ports of the forwarding microchip.

3. The method of claim 1, wherein forwarding, by the forwarding microchip, the first packets to the NIC comprises forwarding, by the forwarding microchip and via a Layer-2 switching operation from the first virtual port and the physical communication link with the NIC, the first packets to the NIC.

4. The method of claim 1, wherein forwarding, by the forwarding microchip, the first packets to the NIC comprises forwarding, by the forwarding microchip and via a Layer-3 routing operation from the first virtual port and the physical communication link with the NIC, the first packets to the NIC.

5. The method of claim 1,
wherein the first VLAN identifier comprises an outer VLAN identifier, wherein receiving the first packets via the one or more external-facing physical ports of the chassis comprises receiving first packets, each tagged with an inner VLAN identifier, and wherein forwarding, by the forwarding microchip, the first packets to the NIC comprises
forwarding the first packets tagged with both the outer VLAN identifier and the inner VLAN identifier to the NIC.

6. The method of claim 1,
wherein the first VLAN identifier comprises an outer VLAN identifier,
wherein receiving the second packets via the first virtual port and the physical communication link with the NIC comprises receiving second packets, each tagged with an inner VLAN identifier, and
wherein removing the first VLAN identifier from the second packets comprises removing the outer VLAN identifier applied to from the second packets,
wherein forwarding, via the one or more external-facing physical ports of the chassis, the second packets comprises forwarding, via the one or more external-facing physical ports of the chassis, the second packets tagged with the inner VLAN identifier.

7. A forwarding microchip configured for insertion within a chassis of a network device, the forwarding microchip comprising:
a physical link configured to interface with each of one or more external-facing physical ports of the chassis; and
a physical communication link configured to communicatively couple with a Network Interface Controller (NIC) housed by the chassis,
wherein the forwarding microchip is configured to:
configure a network functions virtualization (NFV) backplane within the network device, wherein configuring the NFV backplane within the network device comprises configuring the forwarding microchip with a plurality of virtual ports for forwarding Virtual Local Area Network (VLAN)-tagged packets over the physical communication link to the NIC by assigning VLAN identifiers to pairs of the plurality of virtual ports of the forwarding microchip and a plurality of virtual ports configured for respective software-implemented virtual network functions (VNFs) of a plurality of VNFs executing on processing circuitry of the network device;
receive first packets via the one or more external-facing physical ports of the chassis;
attach, based on a determination that the first packets are associated with a first VNF of the plurality of VNF, a first VLAN identifier to the first packets, the first VLAN identifier assigned to a first pair, of the pairs, that is a first virtual port of the plurality of virtual ports of the forwarding microchip and a second virtual port of the plurality of virtual ports configured for the respective VNFs, the second virtual port configured for the first VNF;
forward, via the first virtual port and the physical communication link with the NIC, the first packets to the NIC for forwarding, by the NIC and based on the first VLAN identifier, to the second virtual port for the first VNF for processing by the first VNF;
receive, via the first virtual port and the physical communication link with the NIC, second packets originating from the second virtual port for the first VNF, wherein the first VLAN identifier is attached to the second packets;
remove the first VLAN identifier from the second packets; and
forward, via the one or more external-facing physical ports of the chassis, the second packets.

8. The forwarding microchip of claim 7, wherein to assign the respective VLAN identifiers to the pairs of the plurality of virtual ports of the forwarding microchip and the plurality of virtual ports configured for the respective VNFs of the plurality of VNFs, the forwarding microchip is configured to:
for each of the plurality of virtual ports configured for the respective VNFs of the plurality of VNFs, reserve a corresponding virtual port of the plurality of virtual ports of the forwarding microchip.

9. The forwarding microchip of claim 7, wherein to forward the first packets to the NIC, the forwarding microchip is configured to forward, via a Layer-2 switching operation from the first virtual port and the physical communication link with the NIC, the first packets to the NIC.

10. The forwarding microchip of claim 7, wherein to forward the first packets to the NIC, the forwarding microchip is configured to forward, via a Layer-3 routing operation from the first virtual port and the physical communication link with the NIC, the first packets to the NIC.

11. The forwarding microchip of claim 7,
wherein the first VLAN identifier comprises an outer VLAN identifier,
wherein to receive the first packets via the one or more external-facing physical ports of the chassis, the forwarding microchip is configured to receive first packets, each tagged with to an inner VLAN identifier, and
wherein to forward the first packets to the NIC, the forwarding microchip is configured to forward the first packets tagged with both the outer VLAN identifier and the inner VLAN identifier to the NIC.

12. The forwarding microchip of claim 7,
wherein the first VLAN identifier comprises an outer VLAN identifier,
wherein to receive the second packets via the first virtual port and the physical communication link with the NIC, the forwarding microchip is configured to receive second packets, each tagged with an inner VLAN identifier,
wherein to remove the first VLAN identifier from the second packets, the forwarding microchip is configured to remove the outer VLAN identifier from the second packets,
wherein to forward, via the one or more external-facing physical ports of the chassis, the second packets, the forwarding microchip is configured to forward, via the one or more external-facing physical ports of the chassis, the second packets tagged with the inner VLAN identifier.

13. A network device comprising:
a chassis comprising one or more external-facing physical ports;
a forwarding microchip housed by the chassis and physically linked to each of the
one or more external-facing physical ports of the chassis;
a Network Interface Controller (NIC) housed by the chassis and communicatively coupled to the forwarding microchip within the chassis via a physical communication link; and
processing circuitry housed by the chassis, wherein the processing circuitry is configured to execute a plurality of software-implemented virtual network functions (VNFs), wherein the network device is configured to configure a network functions virtualization (NFV) backplane within the network device, wherein to configure the NFV backplane within the network device, the network device is configured to configure the forwarding microchip with a plurality of virtual ports for forwarding Virtual Local Area Network (VLAN)-tagged packets over the physical communication link to the NIC by assigning respective VLAN identifiers to pairs of the plurality of virtual ports of the forwarding microchip and a plurality of virtual ports configured for respective VNFs of the plurality of VNFs, wherein the forwarding microchip is configured to:
   receive packets, each tagged with an inner VLAN identifier, via the one or more external-facing physical ports of the chassis;
   attach, based on a determination that the packets are associated with a first VNF of the plurality of VNFs, a first an outer VLAN identifier to the packets, the outer VLAN identifier assigned to a first pair, of the pairs, that is a first virtual port of the plurality of virtual ports of the forwarding microchip and a second virtual port of the plurality of virtual ports configured for the respective VNFs, the second virtual port configured for the first VNF; and
   forward, via the first virtual port and the physical communication link with the NIC, the packets tagged with both the outer VLAN identifier and the inner VLAN identifier to the NIC, and wherein the NIC is configured to forward, based on the outer VLAN identifier, the packets to the second virtual port for the first VNF for processing by the first VNF.

14. The network device of claim 13, wherein to assign the respective VLAN identifiers to the pairs of the plurality of virtual ports of the forwarding microchip and the plurality of virtual ports configured for the respective VNFs of the plurality of VNFs, the forwarding microchip is configured to:
   for each of the plurality of virtual ports configured for the respective VNFs of the plurality of VNFs, reserve a corresponding virtual port of the plurality of virtual ports of the forwarding microchip.

15. The method of claim 1, wherein forwarding, by the NIC and based on the first VLAN identifier, the first packets to the second virtual port for the first VNF comprises forwarding, by the NIC and based on the first VLAN identifier, the first packets to the second virtual port for the first VNF without the use of Single-Root Input/Output Virtualization (SR-IOV).

* * * * *